W. C. CARR.
MOTOR TRUCK.
APPLICATION FILED APR. 25, 1914.
1,185,630.
Patented June 6, 1916.
5 SHEETS—SHEET 1.
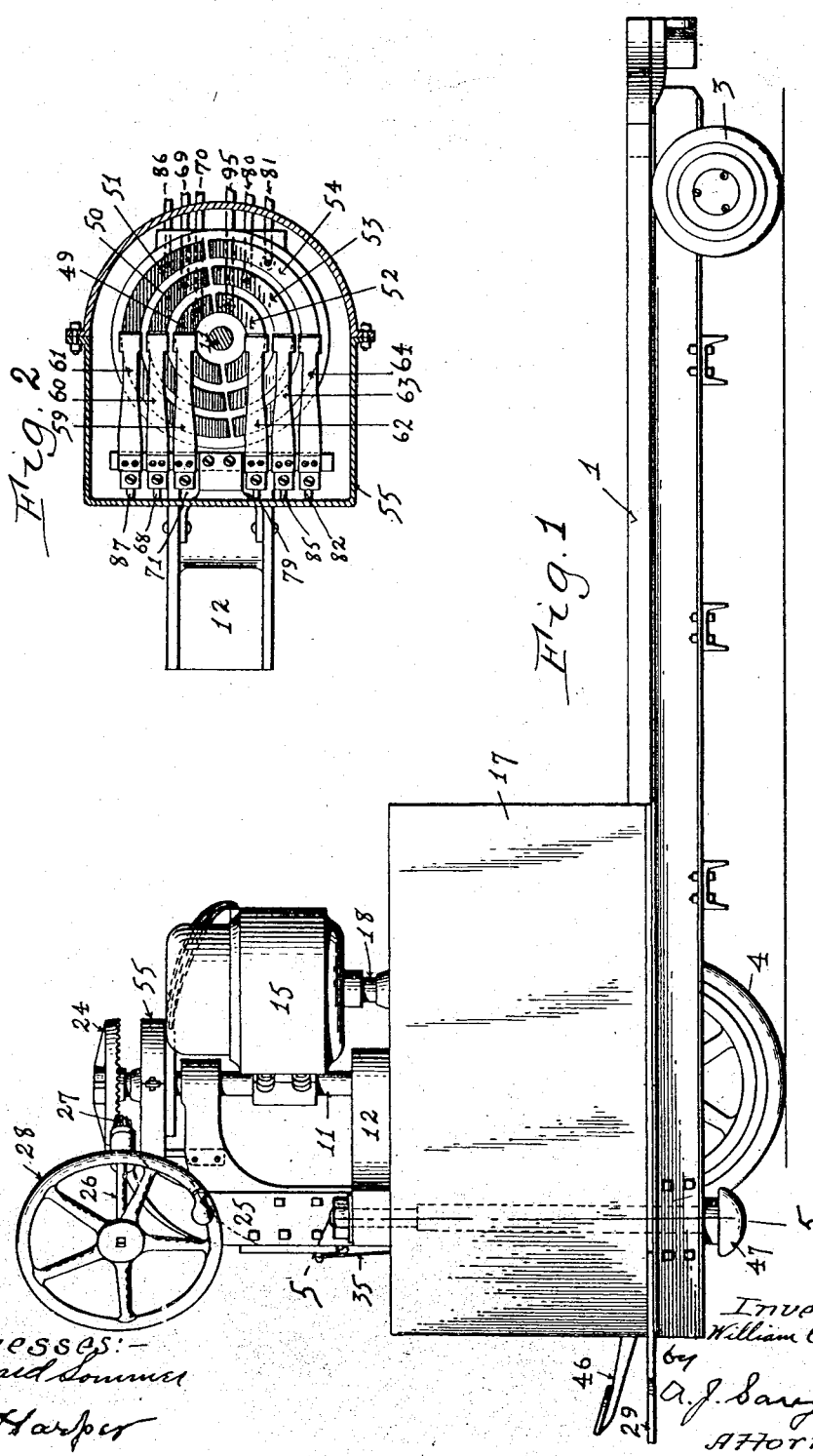

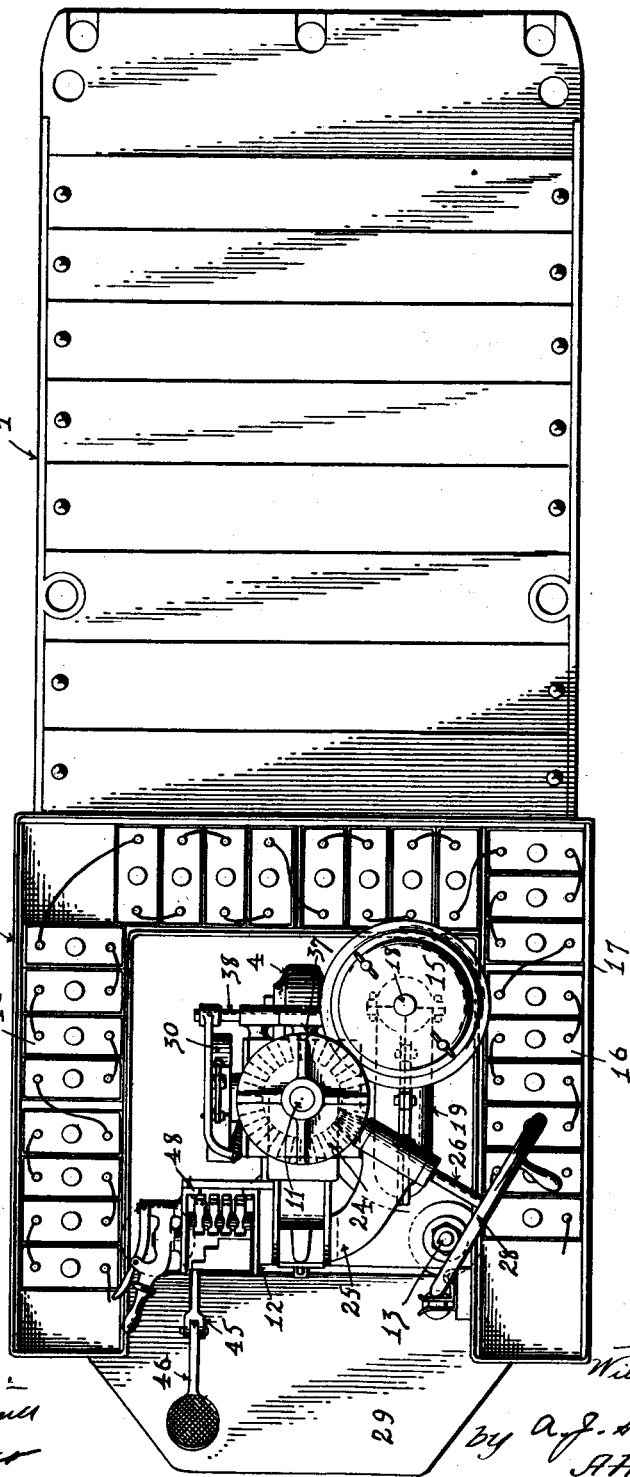

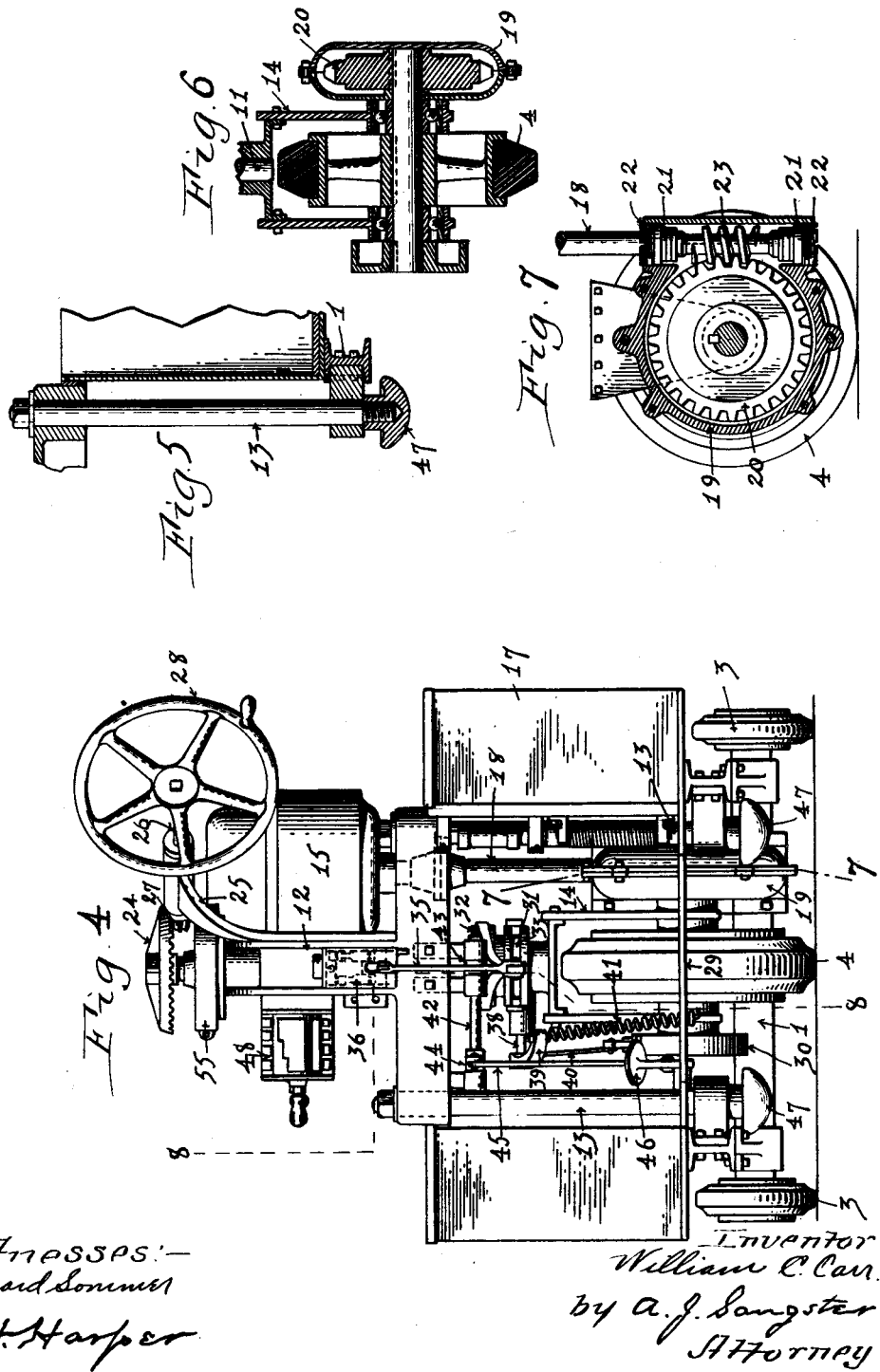

W. C. CARR.
MOTOR TRUCK.
APPLICATION FILED APR. 25, 1914.
1,185,630.
Patented June 6, 1916.
5 SHEETS—SHEET 4.
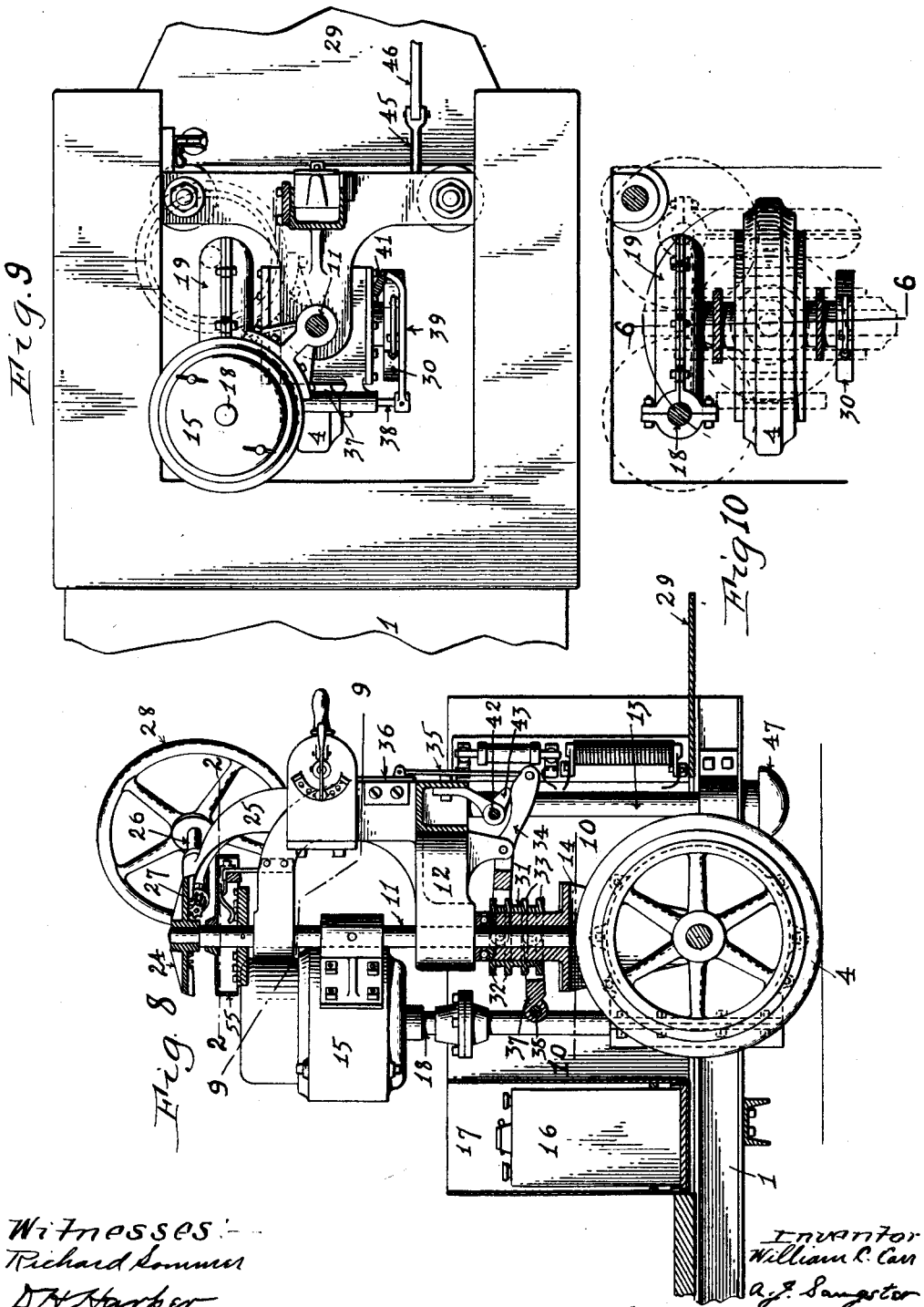

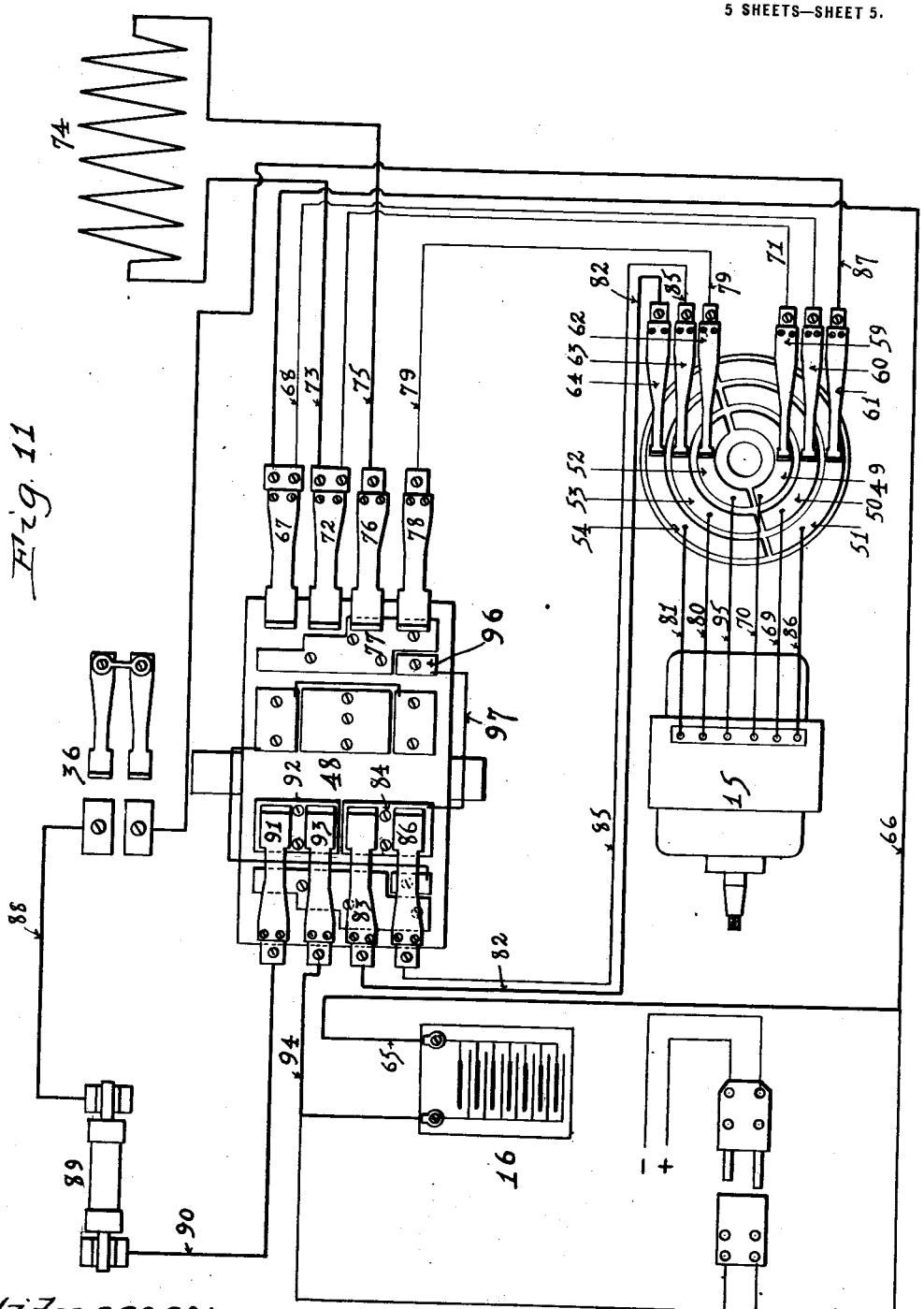

UNITED STATES PATENT OFFICE.

WILLIAM C. CARR, OF BUFFALO, NEW YORK, ASSIGNOR TO AUTOMATIC TRANSPORTATION COMPANY, OF BUFFALO, NEW YORK.

MOTOR-TRUCK.

1,185,630.  Specification of Letters Patent.  Patented June 6, 1916.

Application filed April 25, 1914. Serial No. 834,369.

*To all whom it may concern:*

Be it known that I, WILLIAM C. CARR, a citizen of the United States, residing at Buffalo, in the county of Erie and State of New York, have invented certain new and useful Improvements in Motor-Trucks, of which the following is a specification.

My invention relates to improvements in motor trucks.

More particularly it relates to improvements in motor trucks of the three-wheel type which are electrically propelled.

The object of my invention is to provide a motor truck of the three-wheel type which carries its own supply of electric energy, in which the motor and motor connections are in constant and definite relations to the driving wheel so that the application of power is uniform for all positions of steering, which is simple and durable in construction, and which may be readily and rapidly operated under the varying and difficult conditions to which such a vehicle is necessarily subjected. These and other new and useful improvements will be understood from the following specification and claims, and from the drawings in which,—

Figure 1 is a side elevation. Fig. 2 is a section on the line 2—2 of Fig. 8. Fig. 3 is a plan view. Fig. 4 is a rear view. Fig. 5 is a section on the line 5—5 of Fig. 1. Fig. 6 is a section on the line 6—6 of Fig. 10. Fig. 7 is a detail of the worm drive on the line 7—7 of Fig. 4. Fig. 8 is a section on the line 8—8 of Fig. 4. Fig. 9 is a section on the line 9—9 of Fig. 8. Fig. 10 is a section on the line 10—10 of Fig. 8. Fig. 11 is a diagram of circuits.

A platform 1, preferably constructed of angle-iron, has at its front end the two small wheels 3, 3, which are mounted upon fixed axles with antifriction bearings.

4 is the driving or propelling and steering wheel, which is mounted in a yoke 14, which is rigidly secured to and rotates with the vertical shaft 11. This shaft 11 is carried in a heavy bracket 12 which is mounted upon the stud-posts 13 rigidly secured to the platform 1. Mounted upon and in rotation with the shaft 11 is a D. C. motor 15, which takes its power from the batteries 16 carried upon the platform 1 and properly protected by casing 17. The shaft 18 of the motor 15, as clearly shown in Fig. 7, extends down into the casing 19 of the gear 20, which is keyed to the axle upon which the propelling wheel 4 is rigidly mounted. Within this casing the shaft 18 rotates in thrust-bearings 21, which are adjustable by means of screw-studs 22, and carries the worm 23 which engages with the gear 20. By this means the wheel 4 is driven by the motor 15.

Secured to the upper end of the shaft 11 is a bevel-gear 24. Mounted to rotate in a bearing in a bracket 25 which is rigidly secured to the yoke 12 is a shaft 26 which carries upon its inner end a pinion 27 in mesh with the bevel-gear 24, and which carries upon its outer end a hand-wheel 28. By rotation of the hand-wheel 28, rotation of the shaft 11 is produced and the propelling wheel 4 is steered. The platform 1 has an extension 29 upon which the driver stands when operating the truck.

Mounted upon the yoke 14 is a brake 30, of any desired type. This brake, which necessarily rotates with the steering of the truck, is operated in the following manner: Mounted over the sleeve of the yoke 14 is a collar 31 which is free to slide axially thereon. This collar has flanges 32 and 33, and within the pair 32 one end of a lever 34 engages. This lever 34 is medially pivoted in a lug on the bracket 12, and at its outer end is pivoted to a rod 35 which, in turn, is pivoted to an electric switch 36, which, when the brake is put on, opens the circuit of the motor 15. A lever 37 is pivotally supported by lugs on the yoke 14 and is rigidly mounted upon a shaft 38, and the free end of this lever engages within the flanges 33 of the sleeve 31. Rigidly mounted upon the shaft 38 is a lever 39 which is pivotally connected with a rod 40 which connects with the brake 30, and which, at its free end, is connected with a retracting spring 41. Pivoted on lugs secured to the bracket 12 is a shaft 42 which has a cam-lug 43 which acts upon the upper side of the lever 34, and which has a lever 44 to which is pivoted a rod 45 which is pivoted to the brake treadle 46. It will now be seen that the spring 41, through the connections just described, normally holds the sleeve 31 down, and consequently holds the brake 30 off and the electric switch 36 closed; and when the treadle 46 is pressed down, the sleeve 31 is raised, the brake applied and the electric switch opened. In this manner, whatever the steering position of the propelling wheel 4, whenever the brake treadle is forced down, the brake is applied and the motor circuit is opened without the necessity of the operator moving the controller. This renders the truck quickly responsive to the brake control by the operator.

In order to prevent the truck from skidding or tipping over, I secure to the lower ends of the stud-posts 13 thimbles or shoes 47, one of which and the manner of mounting is clearly shown in Fig. 5.

I have shown my truck constructed to permit of three speeds through a controller 48, of any desired type. But whatever connections are employed it is evident that, since the motor 15 is mounted in rotation with the shaft 11 and the batteries are stationary or non-rotating, it is necessary that there should be proper connections between the electrical conductors which are rotating and the portions of those conductors which are non-rotating. This construction is clearly shown in Figs 2 and 11. Mounted upon, in rotation with, but insulated from, the shaft 11 are sectors 49, 50, 51, 52, 53, 54. These segments are inclosed in a casing 55 which is rigidly mounted upon the bracket 12, and carried by, but insulated from, this casing are contacts 59, 60, 61, 62, 63, and 64, which make electrical connection respectively with the aforementioned sectors. From said segments wires lead to the motor, and from said contacts wires lead to the controller 48. The sectors and contacts are always in electrical connection, whatever the position of the propelling wheel 4, and this construction prevents either breaking or cross-circuiting of the conductors as would otherwise occur. By reference to Fig. 11 the circuits may now be traced.

When the controller 48 is set for the lowest speed, as shown in the diagram, current will flow from batteries 16 through wires 65, 66, contact 67, wire 68, contact 60, segment 50, wire 69, motor 15, wire 70, segment 49, contact 59, wire 71, contact 72, wire 73, resistance 74, wire 75, contact 76, plate of controller 77, contact 78, wire 79, contact 62, segment 52, wire 95, motor 15, wire 80, segment 53, contact 63, wire 85, contact 86, plate 84 on controller, contact 83, wire 82, contact 64, segment 54, wire 81, motor 15, wire 86, segment 51, contact 61, wire 87, switch 36, wire 88, fuse 89, wire 90, contact 91, plate 92 on controller, contact 93, and wire 94 back to battery.

When the controller is moved to the second speed, so that the contact 72 makes electrical connection with the plate 77, current flows from battery 16 through wires 65, 66, contact 67, wire 68, contact 60, segment 50, wire 69, motor 15, wire 70, segment 49, contact 59, wire 71, contact 72, plate 77 on controller, contact 78, wire 79, contact 62, segment 52, wire 95, motor 15, wire 80, segment 53, contact 63, wire 85, contact 86, plate 84 on controller, contact 83, wire 82, and thence back to battery by the path above described.

When the controller is set for the highest speed, the contact 67 makes electrical connection with the plate 77, and the contact 78 breaks connection with the plate 77 and makes electrical connection with the plate 96. Current then flows from battery 16 through wires 65, 66 and contact 67, and there divides, one portion going through wire 68, contact 60, segment 50, wire 69, motor 15, wire 80, segment, 53, contact 63, wire 85, contact 86, plate 84 on controller, contact 83, wire 82, contact 64, segment 54, to wire 81. And the other portion goes from contact 67 to plate 77 on controller, contact 72, wire 71, contact 59, segment 49, wire 70, motor 15, wire 95, segment 52, contact 62, wire 79, contact 78, plate 96 on controller, wire 97, plate 84 on controller, contact 83, wire 82, contact 64, segment 54 to wire 81. From this point the two branches unite and return to battery through the first-above-described path.

The motor connections with the wires leading thereto need be described no further than to note that the first position of connections above described gives series field and resistance; the second series field and resistance cut out; the third parallel fields and resistance cut out—all well-known arrangements.

I claim as my invention:—

1. In a three-wheel truck, in combination with a frame and two wheels mounted in fixed bearings thereon, a propelling wheel journaled to a vertical shaft carried by a bracket on said frame, an electric motor rigidly mounted on said shaft, a gear mounted in rotation with said propelling wheel, a casing therefor, a worm engaging with said gear which is mounted upon an extension shaft of said motor and thrust-bearings for said extension shaft in said casing.

2. In a three-wheel truck, in combination with a frame and two wheels mounted in fixed bearings thereon, a propelling wheel carried by a vertical shaft journaled in a bracket on said frame, an electric motor mounted in rotation with said shaft, a gear mounted in rotation with said propelling wheel, a casing therefor, a worm engaging said gear, which worm is mounted upon an extension of the motor shaft, thrust-bearings for said extension shaft in said casing and adjusting screws for adjusting said thrust bearing.

3. In a three-wheel motor truck, in combination with a frame and two wheels mounted in fixed bearings thereon, a propelling wheel and a vertical shaft and yoke carrying said propelling wheel, which shaft is carried in a bracket on said frame, a motor mounted to rotate with said shaft and gearing connecting it with said propelling wheel and a brake mounted upon said yoke and acting upon said propelling wheel and means for actuating said brake.

4. In a three-wheel truck, in combination with a frame and two wheels mounted in fixed bearings thereon, a propelling wheel and a vertical shaft and yoke carrying said propelling wheel, which shaft is carried by a bracket on said frame, a motor mounted in rotation with said shaft and gearing connecting it with said propelling wheel, a brake mounted upon said yoke, a brake-treadle and rod carried by a non-rotating part of the truck, a sliding sleeve taking over said shaft and having flanges, a lever connecting said sleeve with said brake and a lever connecting said sleeve with said brake-treadle.

5. In a three-wheel motor truck, in combination with a frame and two wheels mounted in fixed bearings thereon, a propelling wheel and a vertical shaft and yoke carrying said wheel, which shaft is carried in a bracket on said frame, a motor mounted in rotation with said shaft and gearing connecting it with said propelling wheel, a brake mounted on said yoke, a brake-treadle and rod carried by a non-rotating part of the truck, a sliding sleeve taking over said shaft and provided with flanges, a lever connecting said sleeve with said brake and a lever connecting said sleeve with said brake-treadle and a retracting spring connected to one of said levers for holding said brake normally out of action.

6. In a three-wheel motor truck, in combination with a frame and two wheels mounted in fixed bearings thereon, a propelling wheel and a vertical shaft and yoke carrying said propelling wheel, which shaft is carried in a bracket on said frame, a motor mounted in rotation with said shaft and gearing connecting it with said propelling wheel, a brake mounted upon said yoke, a brake-treadle and connections for actuating said brake and an electric switch in the circuit of said motor and connections between said switch and said brake mechanism whereby said switch is opened when said brake is applied to said propelling wheel.

7. In a three-wheel truck, in combination with a frame and two wheels mounted in fixed bearings thereon, a propelling wheel, a yoke and vertical shaft carrying said wheel, a motor on and in rotation with said shaft, gearing connecting said motor and propelling wheel, and electrical connections between the rotating and non-rotating parts of the truck comprising electrical conductors carried by and in rotation with said shaft and wires connecting the same with said motor, and contacts making electrical connection with said conductors, which contacts are carried by a non-rotating part of the truck and connected with a source of energy.

8. In a three-wheel truck, in combination with a frame and two wheels mounted in fixed bearings thereon, a propelling wheel, a yoke and vertical shaft carrying said wheel, a motor mounted in rotation with said shaft, gearing connecting said motor and wheel, electrical connections between the rotating and non-rotating parts comprising electrical conductors carried by and in rotation with said shaft and wires connecting the same with said motor, and contacts making electrical connection with said conductors, which contacts are carried by a non-rotating part of the truck, a battery and an electric controller carried by said truck and wires connecting said battery with said controller and said controller with said contacts.

9. In an electrically-propelled three-wheel motor truck in which the motor is carried by and in rotation with the shaft carrying the steering wheel, a battery carried by said truck and electrical connections comprising an electric switch in the motor circuit which is controlled by the brake, electrical connections between the rotating and non-rotating portions of the truck comprising segments in rotation with the steering shaft and contacts secured to a non-rotating part of the machine, and an electrical controller for governing the electric energy transmitted to said motor from said battery.

10. In a three-wheel motor truck having a frame, two wheels mounted in fixed bearings thereon, a third wheel for propelling and steering the truck, a vertical shaft and yoke carrying said propelling and steering wheel, a bracket mounted on said frame carrying said shaft, a motor carried by and in rotation with said shaft and gearing connecting said motor with the propelling wheel, a brake acting upon said propelling and steering wheel and a brake-treadle and connections for actuating said brake, steering mechanism connecting said shaft with a steering-wheel, a steering-wheel, an electric switch actuated by said brake for opening the motor circuit when the brake is applied, and electrical connections between the rotating and non-rotating parts comprising conductor segments in rotation with said shaft and contacts mounted upon a non-rotating part of the truck.

Witness my signature in the presence of two witnesses.

WILLIAM C. CARR.

Witnesses:
A. H. Thees,
V. McElwain.